Patented May 5, 1925.

1,536,545

UNITED STATES PATENT OFFICE.

HERMAN F. WILLKIE, OF BALTIMORE, MARYLAND. ASSIGNOR TO U. S. INDUSTRIAL ALCOHOL CO., A CORPORATION OF WEST VIRGINIA.

PURIFICATION OF ESTERS.

No Drawing.  Application filed December 29, 1921. Serial No. 525,756.

*To all whom it may concern:*

Be it known that I, HERMAN F. WILLKIE, a citizen of the United States, a resident of Baltimore, State of Maryland, have invented a certain new and useful Purification of Esters, of which the following is a specification.

This invention relates to the purification of esters, and particularly to the purification of amyl acetate.

As an example of the treatment of an ester according to the process of the present invention, the purification of amyl acetate will be described. Crude amyl acetate produced from fusel oil is neutralized with caustic soda or other alkaline solution or by merely washing with water and separated from the aqueous layer which is thus formed. The ester layer is placed in a vessel so constructed that the ester may be throughly mixed or agitated and kept cool, and into the ester is run slowly with constant stirring a water solution of potassium permanganate of about 4% strength. The temperature is maintained below 25° C., and the permanganate is added at such a rate that only a slight excess is present at any particular moment. The addition of the permanganate is continued until a distinct pink color remains for some minutes on a further addition of the permanganate. The latter should not be added in excess nor should the temperature be allowed to rise; otherwise there will be the danger of destruction of the ester. The mixture is allowed to stand and settle, a slight warming to about 40° C. being helpful in inducing separation of the ester layer. The latter may be directly rectified in order to purify it, or the reaction mixture may be immediately filtered and the ester layer then separated from the water layer, or a combination of these two procedures may be used, that is, some settling and removal of the ester layer may be carried out followed by a filtration of the remainder of the reaction mixture with subsequent separation of the ester, which is added to that previously removed. In all cases the filtered ester is rectified in order to obtain it chemically pure.

Instead of potassium permanganate, other permanganates may be used and the concentration may be varied from 4% for example up to 10% or as low as .01%. Other oxidizing agents such as chromates and peroxides may be used. These oxidizing agents are substantially neutral as compared with agents of an acid character such as nitric acid. The impurities removed by the oxidizing agent employed such as a solution of potassium permanganate comprise unsaturated bodies and aldehydes such as acetaldehyde, crotonaldehyde, geranial unsaturated aldehydes, acrolein, unsaturated alcohols, allyl achohol, and similar compounds. Potassium permanganate solution will remove aldehydes, acids and carbonic acid, and the quantity employed will naturally depend on the amount of impurities originally present.

In the case of some esters it is desirable to have a preliminary treatment with water or similar liquid such as petroleum oils, glycerine, glycol, etc., in order to remove such impurities as ethyl alcohol and other alcohols, peroxides, sulphates, benzol ($C_6H_6$), and certain odorous impurities. The treatment with water may be carried out by agitating the ester with water in a suitable receptacle, or by distilling the ester through a column which is supplied with a descending current of water. After the water treatment the ester is further treated with an oxidizing agent as above described in order to remove any impurities remaining from the water treatment. An alkaline solution of potassium permanganate may be used containing from .2 to .5 grams permanganate per litre and from 2 to 5 grams sodium hydroxide per litre although these proportions may be varied to the extent that the concentrated solutions may be employed. The order of treatment may be reversed, that is, the operation may be begun by treating with the permanganate first.

The amyl acetate or other ester treated according to the above described process will be obtained in a chemically pure condition free from all impurities. The process is simple and carried out without much difficulty, and the yield of amyl acetate or other ester is very high.

Among the esters which may be treated by the above described process may be mentioned besides amyl acetate, butyl acetate, iso-butyl acetate, propyl acetate, ethyl acetate, other esters of achcohols with acids such as butyric, lactic and carbonic, and also various esters having boiling points above 100° C. and having the property of being insoluble in water. The method is generally applicable to those esters containing impurities such as those described above.

As many apparently widely different embodiments of this invention may be made without departing from the spirit thereof, it is to be understood that I do not intend to limit myself to the specific embodiment thereof except as indicated in the appended claims.

I claim:

1. The process of purifying an impure amyl acetate comprising treating it with an oxidizing agent while cooling the reaction mixture.

2. The process of purifying an impure amyl acetate comprising treating it with a potassium permanganate solution in slight excess while cooling the reaction mixture.

3. The process of purifying an impure amyl acetate comprising treating it with a potassium permanganate solution in slight excess while cooling the reaction mixture allowing the amyl acetate to separate out, and purifying and distilling it.

4. The process of purifying an impure amyl acetate comprising treating it with a slight excess of an oxidizing agent below 25° C.

5. The process of purifying an impure amyl acetate comprising treating it with a slight excess of a permanganate solution having a strength between .01% and 10% at a temperature below 25° C.

6. The process of purifying an impure amyl acetate comprising the step of treating it with a substantially neutral oxidizing agent in an amount sufficient only to oxidize the impurities present and at a temperature sufficiently low to prevent destruction of the acetate.

7. The process of purifying amyl acetate comprising neutralizing it, treating it with a substantially neutral oxidizing agent, and distilling it.

8. The process of purifying amyl acetate comprising neutralizing it, separating it from the aqueous layer formed, agitating it while keeping it cool, adding potassium permanganate solution while avoiding excesses of the latter, allowing the layers formed to settle, and purifying and distilling the amyl acetate layer.

In testimony that I claim the foregoing, I have hereunto set my hand this 5th day of December, 1921.

HERMAN F. WILLKIE.